Nov. 6, 1962     W. A. McGAHAN ETAL     3,062,554
ROTARY SHAFT SEAL
Filed Nov. 26, 1958
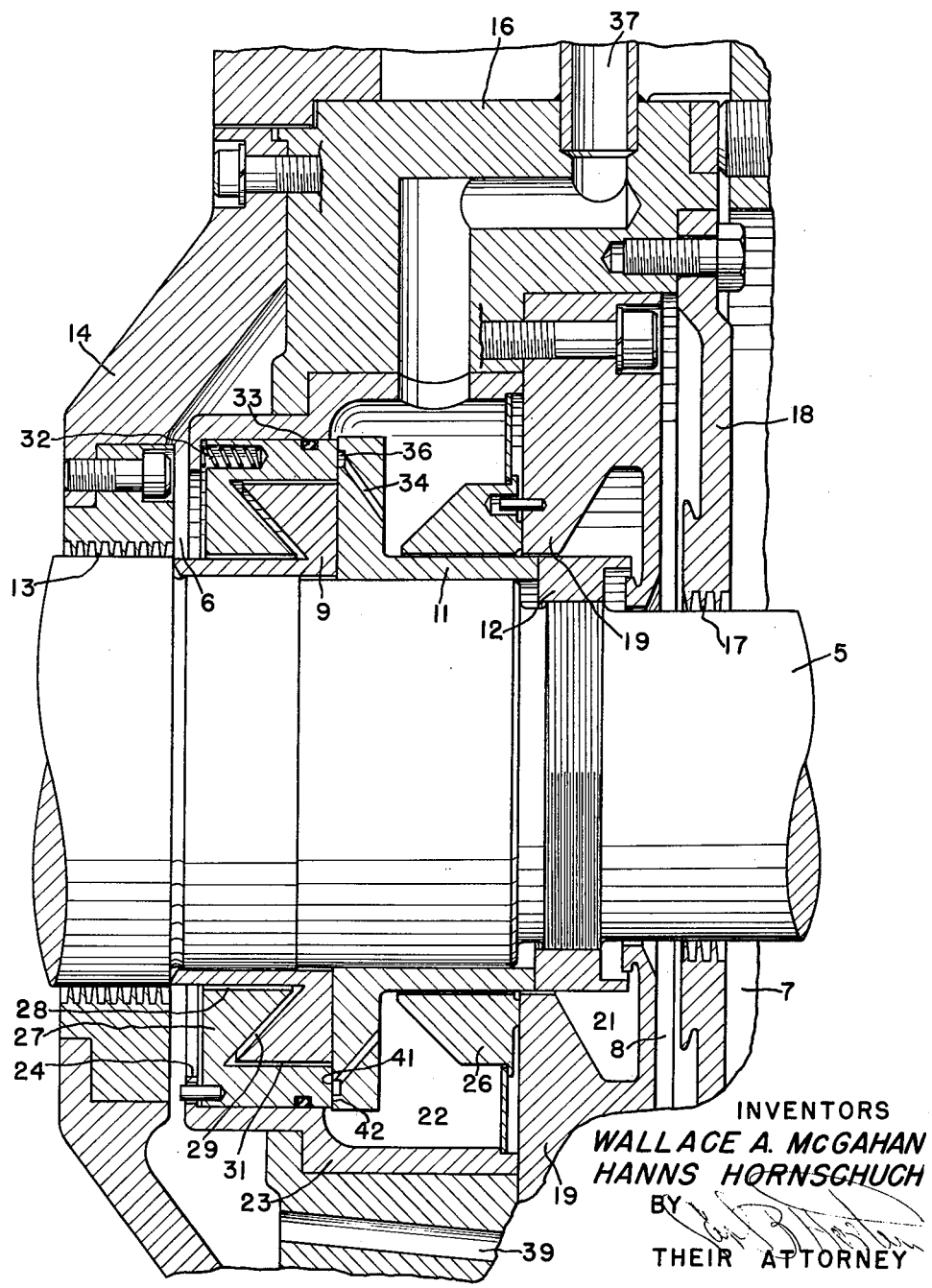
INVENTORS
WALLACE A. McGAHAN
HANNS HORNSCHUCH
BY
THEIR ATTORNEY

United States Patent Office 3,062,554
Patented Nov. 6, 1962

3,062,554
ROTARY SHAFT SEAL
Wallace A. McGahan, Phillipsburg, N.J., and Hanns Hornschuch, Easton, Pa., assignors to Ingersoll-Rand Company, New York, N.Y., a corporation of New Jersey
Filed Nov. 26, 1958, Ser. No. 776,569
5 Claims. (Cl. 277—3)

This invention relates to new and useful improvements in rotary shaft seals for centrifugal compressors and the like and more particularly seeks to provide a lapped surface seal when the shaft is stationary and a lubricated liquid seal between stationary and rotating pieces when the shaft is rotating.

It is well known to provide centrifugal compressors with a sealing liquid along the shaft at a point between the pumped fluid and the atmosphere and at a pressure higher than the highest pressure of the pumped fluid and the atmosphere to avoid leakage therebetween. Certain drawbacks to this system are the necessity to maintain the sealing fluid at pressure even after shaft rotation has ceased, tendency of the sealing liquid at its higher pressure to leak into the pumped fluid, and necessity of circulating the sealing fluid or constantly consuming a certain amount.

Therefore, it is an object of this invention to provide a lubricating liquid seal during rotation of the shaft but a lapped surface seal when the shaft is stationary.

It is also an object of this invention to reduce flow of the sealing liquid into the pumped fluid to a negligible amount.

It is a further object of this invention to provide a high pressure liquid type seal in which a high pressure is developed with the sealing liquid to break valving seal surfaces at a low rotary speed, and a second still higher pressure is developed with a small portion of sealing liquid in successful opposition to the normal high pressure of the sealing liquid and the higher pressure of the first internal impeller so that no sealing liquid is urged toward the pumped fluid.

With these and other objects in view, the nature of which will be more apparent, the invention will be more fully understood by reference to the drawings, the accompanying detailed description and the appended claims.

The drawing is a side view, primarily in section but partly in elevation of the portion of a compressor driving shaft equipped with a sealing system constructed in accordance with this invention.

Referring to the drawing in detail, this invention as illustrated is embodied in a gas compressor but the principle is equally applicable to any gas or liquid centrifugal pump whether the pumped fluid is below or above atmospheric pressure.

The shaft 5 is supported by a bearing (not shown) and driven by a motor (not shown) both to the right of the portion shown and a primary impeller is operatively carried to the left of the portion shown so that gas at high pressure will be in space 6 and air at atmospheric pressure will be in spaces 7 and 8. A cone sleeve 9 and a collar 11 rotate with and are secured to the shaft by a nut 12.

The shaft is shown at its left end encircled by a labyrinth packing ring 13 which in turn is secured to and within the packing ring support 14, the latter being secured to the oil seal flange 16. At its right end as shown, the shaft is rotatable within another labyrinth packing ring 17 formed on the inner surface of the seal end cover 18 which is also secured to the oil seal flange 16. The shaft nut 12 rotates within the annular interior of the seal end plate 19, the latter being provided with an annular space 21 communicating to the right with the atmosphere and to the left with the oil seal chamber 22.

The oil seal chamber 22 is defined by the seal end plate 19 and a seal ring retainer 23, the latter having an annular aperture 24 on the left. The chamber 22 is sealed on the right by outer sealing ring 26 which has a sealing relation with the collar 11 and on the left by the inner cone sealing ring 27 which has a sealing relation with and encircles the cone sleeve 9. However, a small clearance between the sealing surfaces of the ring 27 and sleeve 9 forms a Z-shaped space having an inner passage 28 parallel to and near the shaft, an intermediate passage 29 forming an acute angle with and leading from the inner passage and an outer passage 31 running from the intermediate passage but parallel to the shaft and spaced farther away than the inner passage 28. Passages 28 and 31 of different radii from the shaft center are formed by associated spaced annular surfaces of the cone sleeve 9 and inner sealing ring 27 while passage 29 is formed by associated spaced conical surfaces of the same elements. The inner cone sealing ring 27 does not rotate but is mounted to slide parallel to the shaft axis and is urged to the right and into lapped sealing contact with the rotatable collar 11 by springs 32. An O-ring seal 33 is provided in sealing ring 27 to insure sealing of the sliding surfaces between the sealing ring 27 and the retainer 23.

The collar 11 is provided with a plurality of channels 34 passing from a proximal point facing the end plate 19 and nearer the shaft to a distal point facing the inner sealing ring and farther from the shaft. At the distal end of the channels is an annular space 36 connecting all the channels and being in contact with the inner sealing ring. An oil passage 37 allows entry of oil into the chamber 22.

The aperture 24 of the seal ring retainer leads into space 6 which communicates with passage 39 which is normally closed (not shown). Any sealing liquid moving to the left or pumped fluid moving to the right that reaches space 6 can be taken out through passage 39 to be disposed of. However, this invention practically eliminates the necessity of removing fluids through the passage 39 except during startup.

When the shaft is not rotating, the collar face 41 and the inner sealing ring face 42, fit together to form an absolute seal such that the pumped fluid cannot pass to the outside or the sealing liquid cannot pass into the pumped fluid. In this condition, it is not necessary to supply sealing liquid to the machine and thus the liquid supply may be cut off simultaneously with stoppage of the machine.

Prior to starting the machine, the sealing liquid is preferably supplied at a pressure somewhat higher than the gas pressure in space 6. The pressure of the sealing liquid, for example, may be 5 to 15 lbs. higher than the gas and may be controlled by a differential pressure control valve (not shown) if the gas exists under varying pressures. As the shaft speed increases, pressure is built up in the annular space 36 due to centrifugal force on the liquid in the channels 34 which at a predetermined relatively low speed overcomes the force of springs 32 and slides the inner sealing ring or valve 27 to the left, thus permitting a film of liquid to pass between faces 41 and 42 and effectively lubricating these two faces. At this moment, the fluid circulates, however, between the two faces through chamber 22, channels 34 and annular space 36 to effectively limit the pressure of this internal centrifugal impeller to that necessary to force the two faces apart.

At this given moment, sealing fluid will also pass between the two faces into the outer passage 31 of the cone system and inwardly toward the shaft along intermediate passage 29. However, as the rotary speed of the shaft is increased, centrifugal force pushes the liquid in the tapered passage 29 back toward the outer passage 31 so as to at least balance the maximum pressure of the fluid at 36.

The sleeve 9 thus becomes a centrifugal pump impeller with its inlet at the passage 28 and discharge at passage 31 or vice versa depending upon whether the back pressure in passage 31 is less or greater than the pressure at passage 28. The entrainment of liquid is by friction.

Likewise member 11 is a centrifugal pump impeller with passage 34 terminating at the discharge passage 36.

The members 27 and 34 together act as valve parts between the passages 31 and 36 closed where the machine is stationary, and opened against the biasing spring 32 when any substantial pressure develops at the discharge passage 36 due to rotation of shaft 5.

In the present compressor which uses gas to the left of the seal, an effective maximum pressure is built up in a passage 29 as follows. Once the speed of rotation of a shaft has reached a point where the pressure created in 29 tends to become greater than the pressure at 36 the oil will tend to move from 29 through 31 into chamber 22 until the supply of oil that moved in a reverse direction at a low rotating speed has become nearly exhausted, at which point there will form a mixture of gas and oil in the passage 29 to thus reduce the density therein and the pressure that can be developed. As a matter of practice, the passage 29 will be constructed so that its pressure at the normal running speed for the shaft is greater than the pressure at point 36 when oil is in passage 29. Under these conditions as pointed out before, an effective balance of pressure will be reached due to mixture of oil and gas if gas is in space 6. As soon as all liquid has been discharged from passage 29, the centrifugal force developed therein will drop to zero and opposition to the lubricating oil pressure is merely that of the gas pumped by the compressor proper.

When the shaft is being stopped, the reverse action takes place and before rest, the surfaces 41 and 42 will be in contact as the valve slides laterally. Preferably this will occur at a relatively low speed so that actual contact between the stationary face 42 and the movable face 41 will not be long. In any event, the ring 27 and collar 11 will be made of suitable materials to resist this type of wear.

The pressures developed in passages 29 and 34 by centrifugal motion rely basically on the fact that the proximal ends have a shorter radii from the shaft's axis than the distal ends. Thus the angle of taper may be in either direction or in fact normal to the shaft. Passages parallel to the shaft such as 28 and 31 are used primarily to effectively communicate the impeller ends to a spaced point. However, the inclination of passage 29 could be reversed to eliminate or retain the parallel passages as desired. The particular Z-shape shown allows elements 9 and 27 to be smaller and yet effect a longer sealing surface as well as some throttling effect.

Although the sealing liquid has been described here as oil, it will be appreciated that various liquids can be used for this purpose, e.g., water. The pumped fluid may be gas or liquid, and the pump may be producing a pressure above or below atmospheric pressure in space 6 and the seal will still be effective.

Within the scope of the invention, modifications of particular elements of the structure disclosed may be made while providing the significant and important features of the disclosed invention which utilizes a lapped surface seal during non-rotation of the shaft and opposed balancing of internal pressures during rotation of the shaft to reduce flow of sealing fluid and leakage between sealing liquid, atmosphere and pumped fluid.

We claim:

1. A seal for a rotating shaft comprising, means forming a first chamber for receiving a first fluid at one pressure, second means forming a second chamber for receiving a second fluid at a higher pressure than the pressure of said first fluid, a first member rotatable by said shaft and having a passage communicating with the first chamber to receive first fluid from the latter, a second member rotatable by said shaft and having a second passage communicating with said second chamber to receive second fluid from the latter, said first and second passages being formed to extend in a direction outwardly from the longitudinal axis of said shaft so that rotation of said first and second members generates a pressure by centrifugal force in said first and second fluids, respectively, directed outwardly from the shaft, said first and second passages being disposed for communication with each other to provide communication between said first and second chambers, valve means to control communication between said first and second passages, said valve means being operative to maintain said first and second passages out of communication with each other when said shaft is stationary and upon rotation of said shaft responsive to a predetermined pressure generated by centrifugal force imposed on the second fluid in said second passage by rotation of said second member to communicate said first and second passages, the rotation of said first member being effective to generate a pressure in said first fluid in said first passage substantially equal and opposite to the pressure of said second fluid to prevent flow of said second fluid, through the first and second passages, from the second chamber into the first chamber.

2. The shaft seal of claim 1 wherein the first passage extends outward with respect to the longitudinal axis of said shaft with its end nearest the axis of the shaft disposed furthest away from the first chamber.

3. The shaft seal of claim 1 wherein the first passage is Z-shaped so as to provide two end portions and an intermediate sloping portion, said intermediate sloping portion being disposed to extend away from the axis of the shaft and toward said first chamber.

4. A seal for a rotating shaft comprising, means forming a first chamber for receiving a first fluid under pressure, a second means forming a second chamber for receiving a second fluid under a greater pressure than said first fluid, a rotatable member and a non-rotatable member cooperating to define therebetween an annular passageway having an inlet communicating with said first chamber to receive first fluid from the latter and an outlet, a second rotatable member connected to said shaft for conjoined rotation with the latter, said second member having a plurality of passages each of which has an inlet and an outlet, each of said inlets of said passages communicating with said second chamber to receive second fluid from the latter, said annular passageway and each of said passages in said second member being formed to extend in a direction outwardly from the longitudinal axis of the shaft with their respective outlets disposed further away from the shaft than their respective inlets so that rotation of said rotatable members generates a pressure by centrifugal force in said first and second fluids in the passageway and passages directed toward the outlets of the latter passages, said non-rotatable member being disposed in abutment against said second member to seal said annular passageway outlet and said outlets of said passages and mounted for movement relative to said second member to unseal said outlets and communicate said passages with said annular passageway when the pressure generated by the centrifugal force imposed on the second fluid in said passages by rotation of said second member exceeds a predetermined value, the rotation of said rotatable member being effective to cause a pressure in said first fluid in said annular passageway substantially equal to and opposite the pressure of said second fluid to prevent flow of the latter fluid through said annular passageway into said first chamber.

5. A seal for a rotating shaft comprising, means forming a first chamber for receiving a first fluid under pressure, a second means forming a second chamber for receiving a second fluid under a greater pressure than said first fluid, a rotatable member connected to said shaft to be rotatably carried by the latter, a non-rotatable member disposed in concentric spaced relationship to the rotatable member to define with the latter an annular passageway communicating with said first chamber to receive first fluid from the latter, said non-rotatable member and said rotatable member being so formed that the annular passageway defined therebetween is Z-shaped in cross-section with the inclined portion of said passageway extending outwardly from the axis of the shaft, a second rotatable member connected to said shaft for conjoined rotation with the latter, said second rotatable member having a plurality of passages therein each of which extends from an inlet end portion outwardly from the axis of said shaft to an outlet end portion, each of the inlet end portions of said passages being in communication with said second chamber to receive the second fluid from the latter, said non-rotatable member being biased in abutment against said second rotatable member to seal the outlet end portions of said passages, said non-rotatable member being mounted for slidable movement relative to said second rotatable member to unseal the outlet end portions of said passages and communicate said passages with the annular passageway when the pressure generated by the centrifugal force imposed on the second fluid in said passage by rotation of said second rotatable member exceeds a predetermined value, the rotation of said rotatable member being effective to generate a pressure in said first fluid in said annular passageway equal and opposite to the pressure of said second fluid to prevent flow of said second fluid from the second chamber into the first chamber through the passages and the annular passageway.

References Cited in the file of this patent

UNITED STATES PATENTS

| | | |
|---|---|---|
| 2,136,799 | MacLean | Nov. 15, 1938 |
| 2,220,965 | Kohler | Nov. 12, 1940 |
| 2,494,971 | Summers | Jan. 17, 1950 |
| 2,738,208 | Mylander | Mar. 13, 1956 |
| 2,835,514 | McGahan | May 20, 1958 |
| 2,928,685 | Tracy | Mar. 15, 1960 |